United States Patent
Wang et al.

(10) Patent No.: US 7,426,182 B1
(45) Date of Patent: Sep. 16, 2008

(54) METHOD OF MANAGING SIGNAL PROCESSING RESOURCES

(75) Inventors: Jianxin Wang, Sunnyvale, CA (US); Sitaram Vishnu Yaji, Karanataka state (IN); Manikandan Anantharaman Kenyan, Sunnyvale, CA (US); Pankaj Malhotra, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1028 days.

(21) Appl. No.: 10/231,783

(22) Filed: Aug. 28, 2002

(51) Int. Cl.
*H04J 3/16* (2006.01)
*H04L 12/66* (2006.01)
*G06F 15/173* (2006.01)
*G06F 17/00* (2006.01)

(52) U.S. Cl. .............. 370/235; 370/395.41; 370/401; 709/226; 712/28

(58) Field of Classification Search ............ 370/235, 370/395.41, 401; 709/226; 712/28
See application file for complete search history.

(56) References Cited

U.S. PATENT DOCUMENTS

| | | | | |
|---|---|---|---|---|
| 5,208,804 | A * | 5/1993 | Wilson et al. ............ 370/343 |
| 5,442,789 | A * | 8/1995 | Baker et al. ............. 718/105 |
| 5,497,373 | A | 3/1996 | Hulen et al. |
| 5,724,587 | A * | 3/1998 | Carmon et al. ........... 718/104 |
| 5,842,014 | A * | 11/1998 | Brooks et al. ............ 718/103 |
| 5,948,089 | A * | 9/1999 | Wingard et al. .......... 710/107 |
| 6,009,507 | A * | 12/1999 | Brooks et al. ............ 712/28 |
| 6,092,122 | A * | 7/2000 | Liu et al. ................. 709/227 |
| 6,266,342 | B1 * | 7/2001 | Stacey et al. ............ 370/465 |
| 6,370,386 | B1 * | 4/2002 | Williams ................ 455/452.1 |
| 6,445,697 | B1 | 9/2002 | Fenton |
| 6,463,135 | B2 * | 10/2002 | Abrishami et al. ........ 379/100.01 |
| 6,466,559 | B1 * | 10/2002 | Johansson et al. ......... 370/335 |
| 6,535,505 | B1 * | 3/2003 | Hwang et al. ............. 370/352 |
| 6,542,600 | B1 * | 4/2003 | Munson et al. ........... 379/242 |

(Continued)

FOREIGN PATENT DOCUMENTS

EP    1 017 244 A1    7/2000

(Continued)

OTHER PUBLICATIONS http://www.cisco.com/en/US/customer/products/hw/modules/ps2797/products_tech_note09186a00800b65d6.html, Understanding High Density Voice Network Modules, Aug. 13, 2002.

(Continued)

*Primary Examiner*—Alpus H Hsu
(74) *Attorney, Agent, or Firm*—Stolowitz Ford Cowger LLP

(57) ABSTRACT

A method of setting up a new call in a signal processor includes selecting a signal processor that has sufficient bandwidth to open a new channel while assuming that the new channel and any open but unestablished channels on the signal processor require more than a minimum amount of bandwidth per channel. When selecting a signal processor to hold the new channel, the method can assume, for example, that each of the open but unestablished channels will require a maximum amount of bandwidth per channel. Once a signal processor is selected, the new channel is opened in the selected signal processor and an amount of bandwidth is preallocated to that channel. However, if it is later determined that the selected signal processor cannot accommodate bandwidth requirements of the new channel, an amount of preallocated bandwidth for a channel can be immediately released and made available for use by another channel.

22 Claims, 5 Drawing Sheets

U.S. PATENT DOCUMENTS

| | | | |
|---|---|---|---|
| 6,584,108 B1 | 6/2003 | Chung et al. | |
| 6,714,630 B1 * | 3/2004 | Baum | 379/67.1 |
| 6,754,232 B1 * | 6/2004 | Tasker | 370/477 |
| 6,763,017 B1 | 7/2004 | Buckingham et al. | |
| 6,789,058 B2 * | 9/2004 | Shlomot et al. | 704/201 |
| 6,898,208 B1 | 5/2005 | Sligo et al. | |
| 6,970,709 B1 * | 11/2005 | Williams | 455/452.1 |
| 7,010,611 B1 * | 3/2006 | Wiryaman et al. | 709/232 |
| 7,080,010 B2 * | 7/2006 | Shlomot et al. | 704/229 |
| 7,095,759 B1 * | 8/2006 | Fitzgerald | 370/538 |
| 7,096,471 B2 * | 8/2006 | Kosanovic | 718/104 |
| 7,191,446 B2 * | 3/2007 | Kosanovic | 718/104 |
| 2002/0040381 A1 * | 4/2002 | Steiger et al. | 709/102 |
| 2003/0067918 A1 | 4/2003 | DeMars | |
| 2003/0084144 A1 * | 5/2003 | Lipinski | 709/224 |
| 2003/0179767 A1 * | 9/2003 | Kloth et al. | 370/437 |
| 2004/0002339 A1 | 1/2004 | O'Connor | |

FOREIGN PATENT DOCUMENTS

| | | | |
|---|---|---|---|
| EP | 1017244 A1 * | 7/2000 | |

OTHER PUBLICATIONS http://www.cisco.com/en/US/customer/products/hw/voiceapp/ps967/prod_release_note09186a0080081089.html, Release Notes for the Cisco ICS 7750 for System Software Release 1.0.x, Apr. 30, 2001.

"Understanding High Density Voice Network Modules," Aug. 13, 2002.

"Release Notes for the Cisco ICS 7750 for System Software Release 1.0.x," Apr. 30, 2001.

International Telecommunication Union (ITU). ITU-T, G.711 General Aspects of Digital Transmission Systems: Terminal Equipments, Pulse Code Modulation (PCM) of Voice Frequencies (1993).

International Telecommunication Union (ITU). ITU-T, G.729. General Aspects of Digital Transmission Systems. Coding of Speech at 8kbit/s Using Conjugate-Structure Algebraic-Code-Excited Linear-Prediction (CS-ACELP) (Mar. 1996).

International Telecommunication Union (ITU). ITU-T, G.729, Annex A. Series G: Transmission Systems and Media; General Aspects of Digital Transmission Systems. Coding of Speech at 8kbit/s Using Conjugate-Structure Algebraic-Code-Excited Linear-Prediction (CS-ACELP). Annex A: Reduced complexity 8 kbit/s CS-ACELP speech codec (Nov. 1996).

* cited by examiner

METHOD OF MANAGING SIGNAL PROCESSING RESOURCES

BACKGROUND OF THE INVENTION

1. Field of the Invention

The present invention relates to methods for managing signal processing resources. More specifically, this invention relates to a method for more efficiently allocating signal processing resources in digital signal applications.

2. Related Art

FIG. 1 is a schematic block diagram of a system 10 used in a Voice-over Internet Protocol (VoIP) application. Referring to FIG. 1, in VoIP applications, digital signal processors (DSPs) 30a, 30b, typically found in a network device such as a Network Access Server (NAS) 25a, are used to compress and convert legacy Time-Division-Multiplexing (TDM) streams from a Public Switched Telephony Network (PSTN) 20 into Internet Protocol (IP) packets. A NAS receives the TDM signals, for example, through a T1 or E1 line, and converts them into IP packets. The packets are then transmitted through a network interface 40a (e.g., Fast Ethernet) over an IP Network 15. An Internetwork Operating System (IOS) 35a runs on the NAS 25a and can be used to track and control the operation of the DSPs 30a, 30b. DSPs can also be used, for example, in Voice-over-Asynchronous Transfer Mode (VoATM), Voice-over Frame Relay (VoFrameRelay), and other similar applications.

Unfortunately, DSPs have limited computational power, measured in terms of a number of Million Instructions Per Second (MIPS). A DSP, therefore, can only process a limited number of channels. The number of channels that the DSP can process depends primarily on the complexity of a compression coding and decoding (codec) type used for the channels. The different channels can either have the same codec type or different codec types. For example, a typical model C549 DSP, manufactured by Texas Instruments (TI), has 100 total available MIPS and can, for example, process eight channels of G.711 calls, or two channels of G.711 calls plus three channels of G.729a calls. Table 1 identifies various codec types and their associated processing bandwidth requirements.

TABLE 1

Codec Types.

| Codec Type | Max # Channels per DSP* | MIPS required per channel |
|---|---|---|
| G.711 ulaw or Alaw | 8 | 12 |
| G.729a | 4 | 25 |
| G.726 | 4 | 25 |
| G.723.1 | 3 | 33 |
| G.728 | 3 | 33 |
| Fax Relay | 4 | 25 |

*Assuming 100 MIPS available per DSP.

A typical VoIP call on a DSP is set up in two steps. These steps are primarily dominated by the VoIP protocol and are therefore not implementation specific. In a first step, the voice channel is opened on a DSP with the minimum allowable MIPS consumption (e.g., 12 MIPS) preallocated. At this time, the DSP does not have any information on what codec type will be used once the channel is established. The codec type is determined through negotiation between the voice entities. The codec information is typically carried by an H.323 capabilities exchange or in a Media Gateway Control Protocol (MGCP) ModifyConnection (MDCX) package.

In a second step, the codec type is set on the DSP and more MIPS are acquired, if needed. Additional MIPS may be required, for example, if a higher complexity codec type is selected. For example, if a G.729a codec type is to be used, an additional thirteen MIPS (25 required MIPS−12 preallocated MIPS=13) are required by the voice channel.

The first step of the call setup can occur at the same time for multiple VoIP calls, before any of those calls reach the second step. Accordingly, unless an effective method of managing DSP resources (e.g., available MIPS) is provided, the DSPs may have unbalanced load, resulting in inefficient DSP utilization.

Existing methods for managing DSP resources include a "channel-oriented" approach and a "complexity-oriented" approach. In the channel-oriented approach to DSP resource management, a fixed number of channels are established per DSP. For example, a DSP can be configured to process up to four voice channels, no matter which codec type is used. The drawback of this approach, however, is that a DSP using this scheme generally has fewer channels established than it is capable of handling. In the example above, for instance, the DSP is limited to processing a maximum of four channels of G.711 calls even though it can actually handle eight channels of this codec type.

In the conventional "complexity-oriented" resource management approach, DSP resources are managed based on an allocation of MIPS. Using this approach, the DSP with the most available MIPS is chosen to open a call channel. The call is prematurely disconnected, however, if it later requires more MIPS than are available. The primary drawback to this approach is that the "maximum MIPS" rule used to select the DSP during the first call setup step may not allocate voice channels to the most appropriate DSP. This can result in one or more, or all, of the channels later being prematurely disconnected. A substantial amount of the available bandwidth on a DSP may therefore not be utilized.

SUMMARY OF THE INVENTION

According to principles of this invention, a signal processor that has sufficient bandwidth to open a new channel is preferably selected by assuming that the new channel, as well as any open but unestablished channels on that signal processor, will require more than a preallocated (e.g., minimum) amount of bandwidth when established. When selecting a signal processor to process the new channel, it can be assumed, for example, that each open, unestablished channel will require a maximum amount of bandwidth when established. The new channel is opened in a selected signal processor.

A method for selecting a signal processor to hold a new channel preferably identifies a first signal processor having a maximum amount of available bandwidth. The method can then determine whether the available bandwidth in the first signal processor is sufficient to meet the bandwidth requirements of the new channel, assuming that the new channel and any open but unestablished channels on the first signal processor will require a maximum amount of bandwidth per channel when established. The first signal processor is then selected if the amount of available bandwidth is determined to be sufficient.

If the bandwidth of the first signal processor is insufficient, the method can continue by then determining whether an amount of available bandwidth in a second signal processor is sufficient to meet the bandwidth requirements of the new channel, assuming that the new channel and any open but unestablished channels on the second signal processor will require a maximum amount of bandwidth per channel when established. The second signal processor is selected if the amount of available bandwidth therein is sufficient. If the amount of available bandwidth in the second signal processor is also not sufficient, the method can further continue by then determining an amount of spare bandwidth in a plurality of processors and selecting the processor with the greatest amount of spare bandwidth.

A method of selecting a signal processor for opening a signal channel can alternatively include selecting a first signal processor from among a plurality of signal processors, wherein the first signal processor has a maximum amount of bandwidth available. The signal channel can then be opened on the first signal processor if an available bandwidth on the first signal processor is greater than or equal to a maximum additional bandwidth that could possibly be required by the signal channel and any open but unestablished channels. If the available bandwidth on the first signal processor is insufficient, the method can proceed by attempting to locate a second signal processor that has an available bandwidth sufficient to support the maximum possible additional bandwidth that may be required by the new channel and any open but unestablished channels. If no such signal processor is found, the method can select a signal processor with a maximum available spare bandwidth.

According to yet another aspect of this invention, a method of establishing a signal channel can proceed by selecting a signal processor to hold a new channel. The new channel is then opened in the selected signal processor and a minimum amount of bandwidth is preallocated in the signal processor for the new channel. The method then determines whether the selected signal processor can accommodate the new channel based on an actual bandwidth requirement of the channel. If it is determined that the selected signal processor cannot accommodate the new channel, the amount of preallocated bandwidth for that new channel is immediately released and made available for use by another channel.

According to a specific embodiment, in a first step during a VoIP call setup, the minimum MIPS for a channel is preallocated, but a codec with the maximum required MIPS per channel is assumed when searching for a DSP to hold the channel. A "MIPS prediction" mechanism can thereby be introduced into the first step of the call setup to minimize the chance of voice channel misallocation. A voice channel therefore has an increased chance for success in setting the desired codec during a second call setup step.

The method of this embodiment also makes more efficient use of bandwidth in the second call setup step. The bandwidth released by one channel is made available for use by another channel. In a preferred embodiment, during the second step, when the actual codec type and its corresponding MIPS requirement is determined, if there is not enough MIPS to handle the determined codec, other unestablished channels that have not yet reached the second step are searched and closed. The released preallocated MIPS are made available for the channel that reaches the second step. Alternatively, the preallocated MIPS for the channel reaching the second step can be immediately released and made available for other channels that have not yet reached the second step.

The principles of this invention can be invoked, for instance, any time a best fit DSP needs to be selected to run a given codec. These principles are not limited to management of MIPS in a DSP, however, and can also be used, for example, in other resource management applications. One specific alternative application is the management of video processing resources.

BRIEF DESCRIPTION OF THE DRAWINGS

The foregoing objects, features, and advantages of the present invention will become more readily apparent from the following detailed description of preferred embodiments, made with reference to the following figures, in which.

DETAILED DESCRIPTION OF PREFERRED EMBODIMENTS

Various embodiments of the present invention will now be described with reference to the accompanying figures. In general, according to one embodiment of this invention, a new "complexity-oriented" method is provided that improves the efficiency of processor allocation during both first and second call setup steps.

Figure 1:
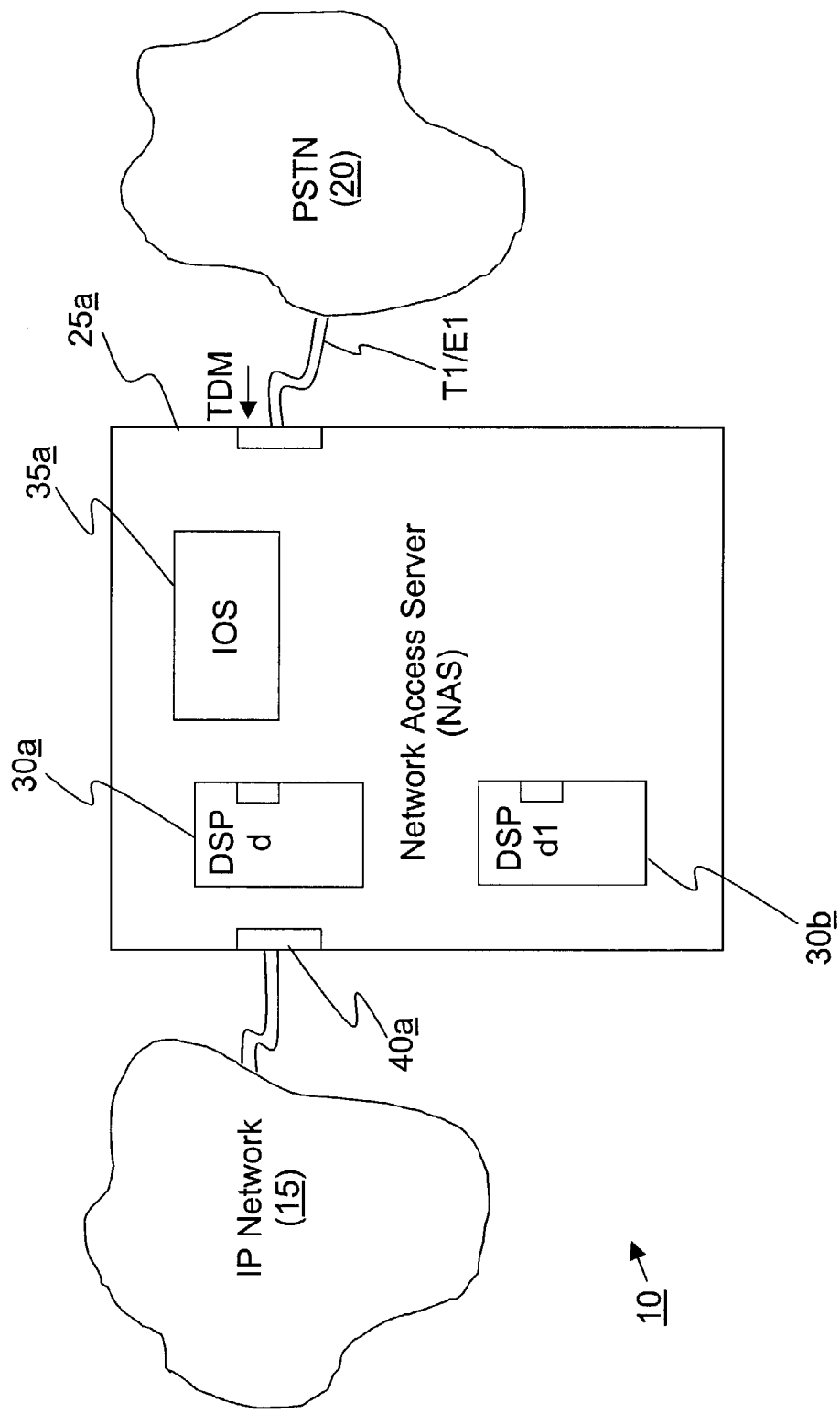
FIG. 1 is a schematic block diagram of a network comprising a network access server (NAS) having digital signal processors (DSPs) for processing voice-over-Internet Protocol (VoIP) calls.
Figure 2:
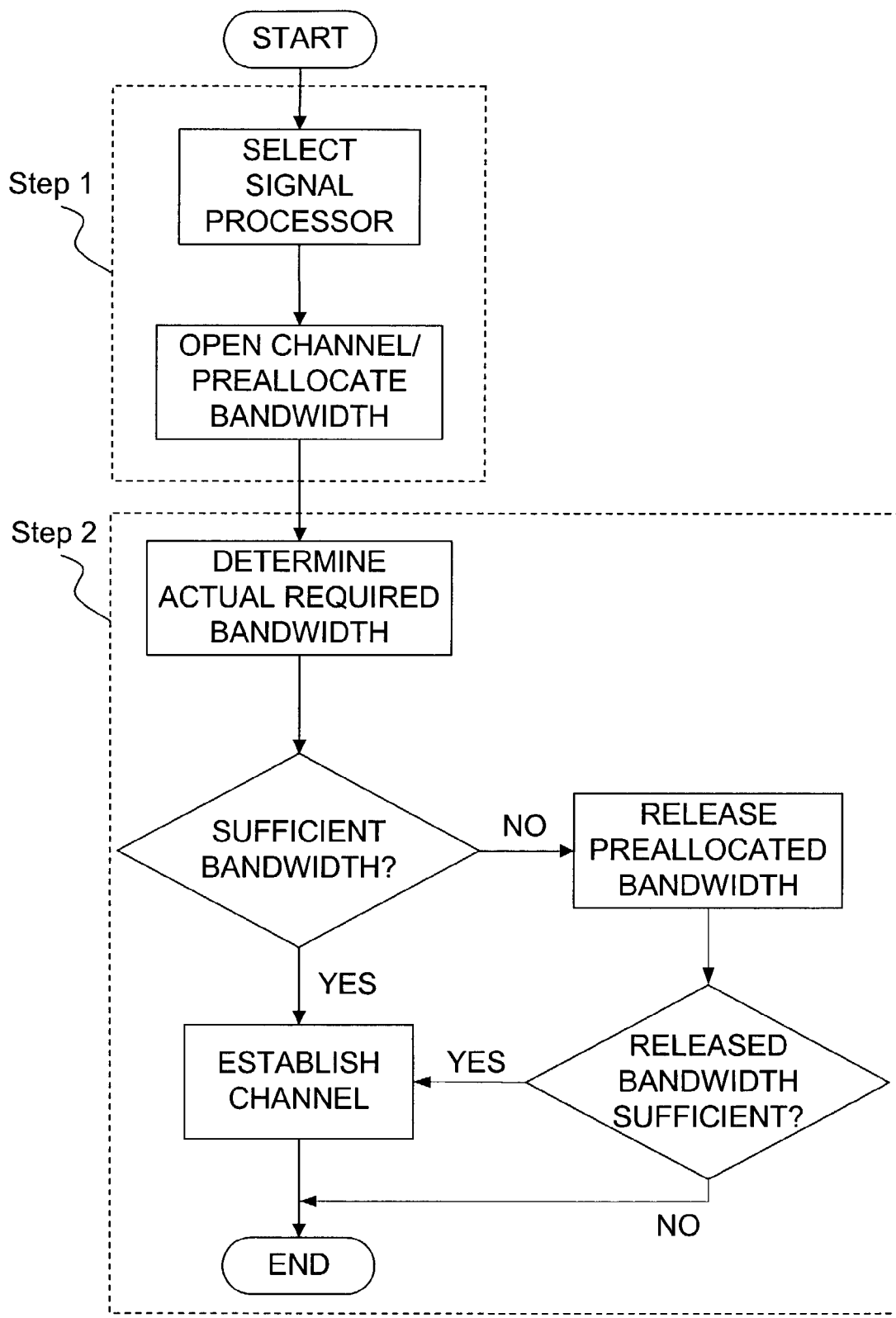
FIG. 2 is a flowchart illustrating a method of managing DSP resources according to an embodiment the present invention.

FIG. 2 is a flowchart illustrating a preferred method of managing signal processing resources according to the principles of this invention. Referring to FIG. 2, in a first call setup step (Step 1) according to this embodiment, as in the conventional method described previously, a signal processor (e.g., a DSP) is selected and a new channel is opened having a minimum possible bandwidth (e.g., MIPS) per channel preallocated. Unlike the conventional approach, however, when searching for a signal processor to hold the new channel, this method preferably assumes the highest complexity signal (e.g., a codec requiring the maximum per channel bandwidth) will be established.

Still referring to FIG. 2, during a second call setup step (Step 2), the method determines the actual signal type and hence the amount of bandwidth required by the new call. If there is sufficient bandwidth available on the signal processor, the call is established. If not, other unestablished channels that have not yet reached the second step are preferably searched and closed. The released preallocated MIPS are thereby made available for the channel that reached the second step. Alternatively, the amount of preallocated bandwidth for the channel reaching the second step can be immediately released for use by other channels that have not yet reached the second step.

In particular, in a DSP used for VoIP calls, when there is not enough MIPS for the determined codec, the preallocated MIPS for other channels can be released and made available for the channel reaching the second step. Alternatively, the preallocated MIPS for the channel reaching the second step can be released for use by other channels that have not yet reached this step. This method thereby minimizes the number of prematurely closed channels.

Signal processor utilization can also be improved, for instance, by moving a channel to another signal processor in the second call setup step according to yet another embodiment of the invention. In this method, when the actual codec type and its corresponding MIPS requirement is determined during the second step, if there is not enough MIPS available to handle the determined codec on the current signal processor, a new signal processor is selected and the channel is moved to the new signal processor. The preallocated MIPS on the current signal processor are then immediately released and made available for other channels that have not yet reached the second step.

Figure 3:
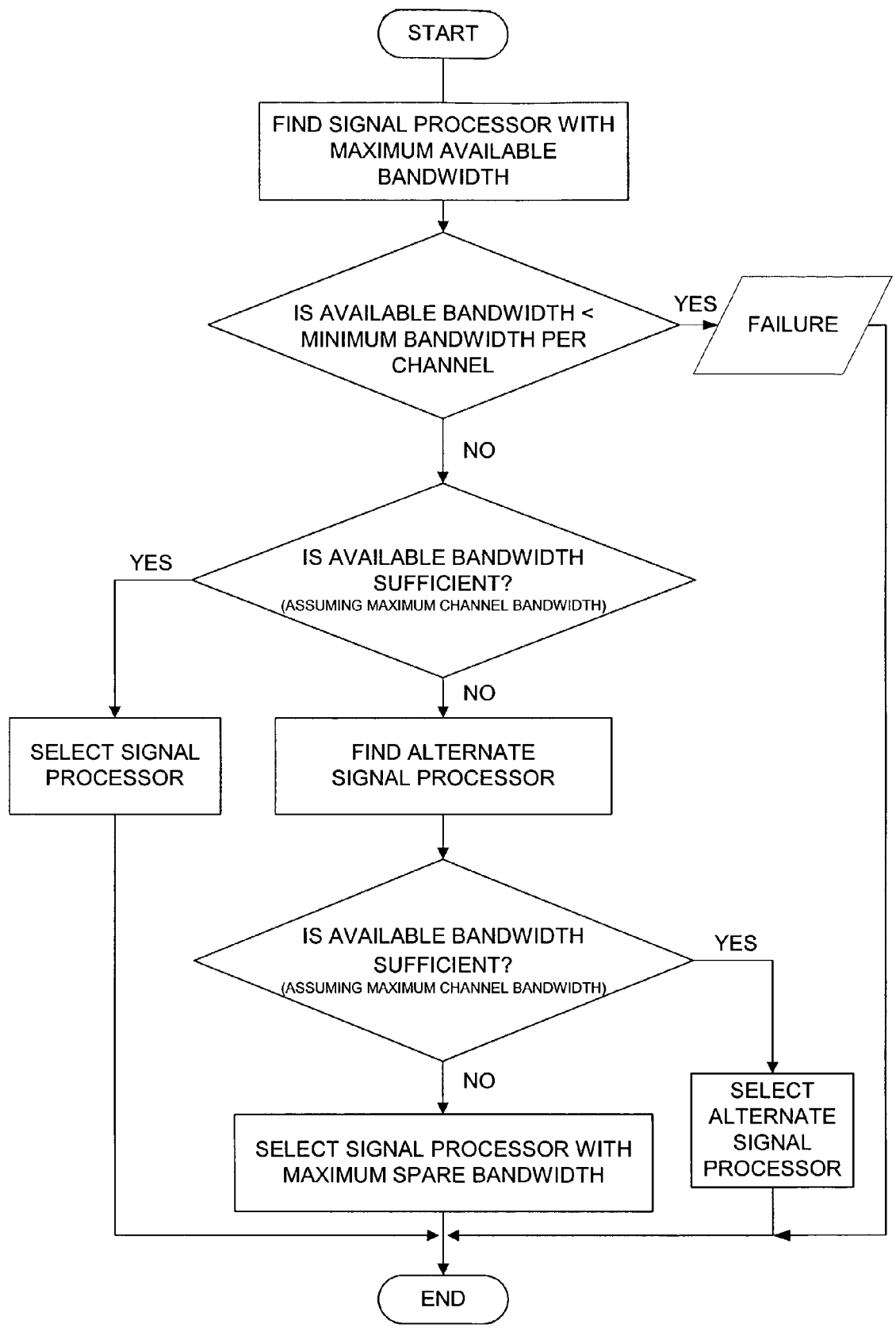
FIG. 3 is a flowchart illustrating a method of selecting a signal processor in which to open a new channel, according to another aspect of the present invention.

FIG. 3 is a flowchart illustrating a preferred method of selecting a signal processor during the first step (Step 1) of the method illustrated in FIG. 2. Referring to FIG. 3, a preferred method of selecting a signal processor begins by finding a first signal processor with the maximum available bandwidth. If the maximum available bandwidth is less than a minimum required channel bandwidth, the attempt fails and the system must wait until more bandwidth becomes available. Otherwise, the method then determines whether the amount of available bandwidth on the first signal processor is sufficient to support the new call channel, assuming that the new channel and any previously open but still unestablished channels will each require the maximum possible per channel bandwidth. If the first signal processor has sufficient bandwidth available, the call is established on that processor.

If the amount of available bandwidth on the first signal processor is not sufficient to hold the call, this method then searches for a second, alternate signal processor in which to establish the channel. When the second signal processor is identified, the method determines whether the amount of available bandwidth on the second, alternate signal processor is sufficient to support the new call channel, assuming that the new channel and any previously open but still unestablished channels on that processor will each require the maximum possible per channel bandwidth. If sufficient bandwidth is available, the alternate signal processor is selected to hold the call.

If neither the first or second processors have sufficient bandwidth to accommodate the maximum possible channel bandwidth requirements, the method then selects the signal processor with the maximum spare bandwidth. Spare bandwidth is the available bandwidth minus the maximum amount of additional bandwidth that may be required by any open but unestablished channels on a signal processor.

A preferred algorithm for implementing the method of FIG. 3 in a VoIP application is as follows:

i. Find DSP (d) with the max amount of MIPS and min number of voice channels opened;
    IF available_mips[d]<MIN_MIPS_PER_CHANNEL
    THEN {return (−1), failure}
    ELSE {go to ii.} ii. Assume that n voice-channels are opened on DSP d, among which m channels do not have codec type determined (i.e., have not yet reached Step 2);
    IF available_mips[d]>=m*(ΔMIPS)+MAX_MIPS_PER_CHANNEL
      where ΔMIPS=MAX_MIPS_PER_CHANNEL−MIN_MIPS_PER_CHANNEL
    THEN {return d, success}
    ELSE {go to iii.} iii. Try to find a DSP d1 (d1!=d) with the maximum available MIPS and with available_mips[d1]>=m1*(ΔMIPS)+MAX_MIPS_PER_CHANNEL
    where ΔMIPS=MAX_MIPS_PER_CHANNEL−MIN_MIPS_PER_CHANNEL, and
    where m1 is the number of channels on DSP d1 without codec determined;
    IF d1 found,
    THEN {return d1, success}
    ELSE {go to iv};

iv. Try to find a DSP d2 (d2!=d, could be d1) with the max available spare MIPS, calculated as: spare_mips_d2=available_mips[d2]−m2*(ΔMIPS)
    where ΔMIPS=MAX_MIPS_PER_CHANNEL−MIN_MIPS_PER_CHANNEL, and
    where m2 is the number of channels on DSP d2 without codec determined;
    IF (spare_mips_d2>spare_mips_d)
    AND (spare_mips_d2>MIN_MIPS_PER_CHANNEL)
    THEN {return d2, success}
    ELSE {return d, success}

The third (iii) and fourth (iv) steps of this algorithm could be implemented in one function using a single pass over the DSPs. The fourth step (iv) addresses the situation where one DSP has many channels starting on it (only Step 1 completed) while other DSPs have many channels in a steady state (Step 2 completed).

Figure 4:
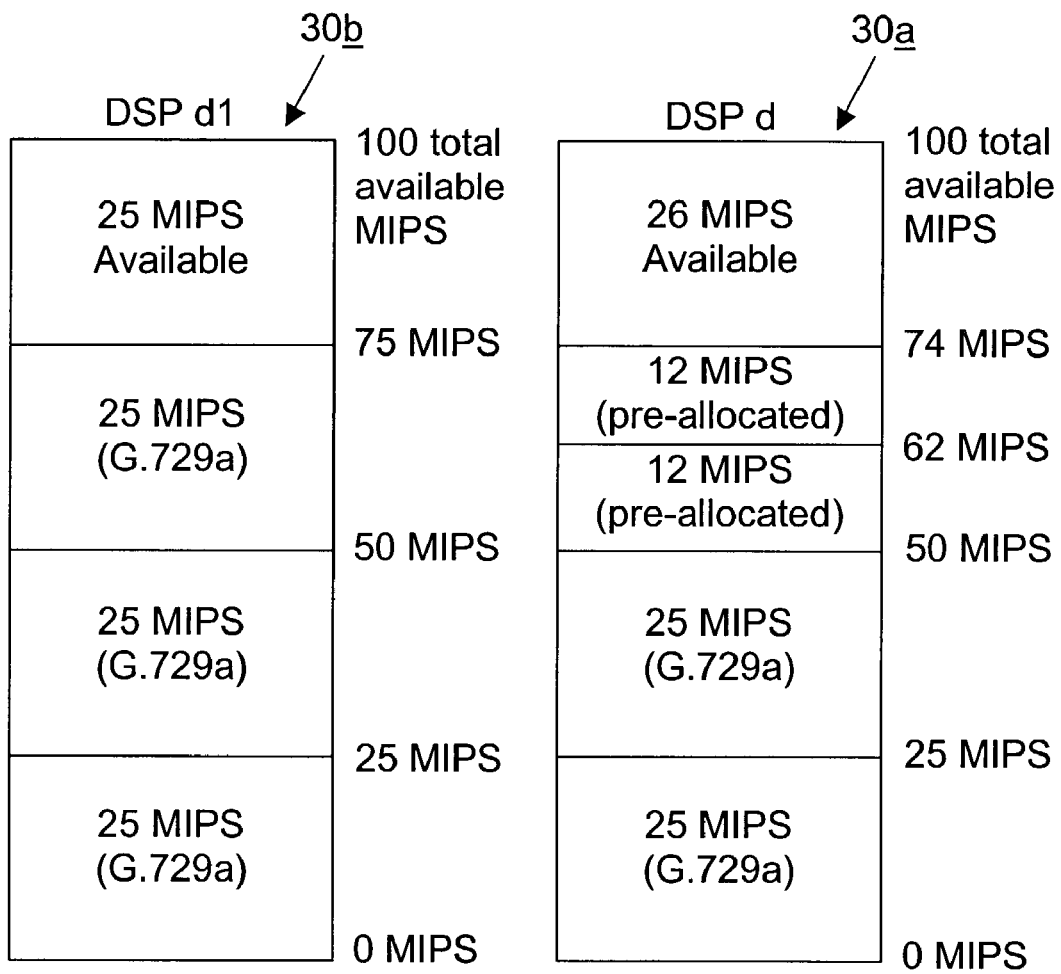
FIG. 4 is a schematic block diagram illustrating MIPS allocation in a plurality of DSPs for comparison between a conventional method of allocating processing resources and a method according to an embodiment of the present invention.
Figure 5:
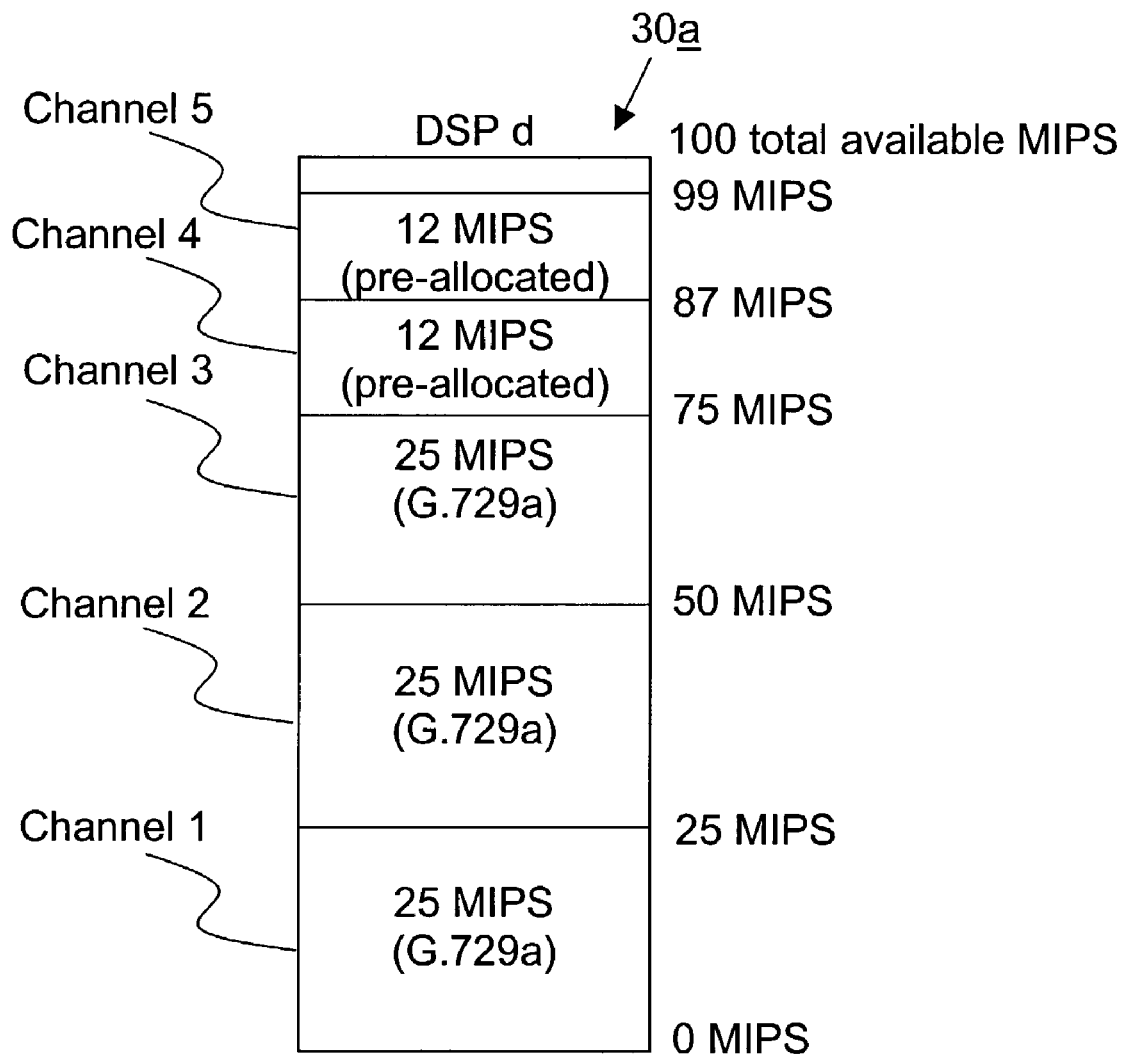
FIG. 5 is a schematic block diagram illustrating MIPS allocation in a DSP for comparing another aspect of the present invention with a conventional method.

FIG. 4 is a schematic block diagram of a plurality of DSPs (d and d1) 30*a*, 302 illustrating MIP allocation among channels. FIG. 5 is a schematic block diagram of a signal processor DSP d 30*a* having 100 total available MIPS, illustrating the allocation of MIPS between five channels (Channels 1-5). For simplicity, in the examples illustrated in FIGS. 4 and 5, it is assumed that the DSPs only support two codec types, G.711 (12 MIPS) and G.729a (25 MIPS).

Referring first to FIG. 4, in the conventional "complexity-oriented" approach when a new call comes in, the new call would be allocated to a first DSP (DSP d) 30*a* because it has the most available bandwidth (26 MIPS compared to 25 MIPS in DSP d1 30*b*). In the conventional approach, however, if the two opened channels on DSP d 30*a* are later set to G.729a (requiring 13 more MIPS each), at least one of the channels will fail if the new channel has also been opened thereon. The second DSP (DSP d1) 30*b* would be able to hold the new call, however, since all of its existing channels are already set with predetermined codecs (i.e., have completed the second step) and therefore won't require additional bandwidth. The method according to the preferred embodiment of the present invention takes potential MIPS requirements into consideration so that the new channel would initially be opened on DSP d1 30*b*.

Referring to FIG. 5, three channels (Channels 1-3) have been opened and established with a G.729a codec type (requiring 25 MIPS). Two additional channels (Channels 4-5) have been opened but not yet established. The two open channels (Channels 4-5) are each preallocated 12 MIPS. Assuming that both these channels (Channels 4-5) will require codec G.729a when established, both channels would fail during the second call setup step in the conventional complexity-oriented approach, because they each require an additional 13 MIPS and only 1 MIPS is available from the DSP.

Unlike the conventional method, however, according to one embodiment of the invention, when the second call setup step determines that there is not enough bandwidth available on the DSP, it searches for and closes one or more other channels that have been opened but not yet established. The preallocated bandwidth for those channels is thereby freed up to service the channel that has reached the second step. In the example illustrated in FIG. 5, the fifth channel (Channel 5)

would be closed, releasing its twelve preallocated MIPS, and thereby allowing the fourth channel (Channel 4) to be established.

In an alternate embodiment of the invention, the channel reaching the second step (e.g., the fourth channel (Channel 4)) can be closed immediately after it fails, thereby releasing its preallocated bandwidth (12 MIPS) for use by other channels. In this embodiment, Channel 5 can utilize the freed MIPS from Channel 4 plus the one MIP previously available (13 MIPS total), and its second call setup step will therefore succeed.

The above-described methods can increase the Call Success Rate (CSR) from between 65 and 80% to 100% when the DSP resources are under heavy load (i.e., simultaneous call setup attempts that reach the upper limit). The introduction of a MIPS prediction mechanism into the first call setup step minimizes the chance of voice channel misallocation. In other words, a voice channel has a greater chance of being successful in setting the desired codec during the second call setup step. Maximum use of MIPS during the second step can also be made by releasing the MIPS preallocated to one channel to make them immediately available for use by another channel. The methods described herein could be invoked, for example, any time a best fit DSP needs to be selected to run a given codec.

Any DSP centric algorithm which has multiple DSP tasks, especially Voice, can benefit from the principles of this invention. The principles described above can further be used in any resource management application and are not limited to the management of MIPS in a DSP. Other possible areas of use include management of video processing resources.

Having described and illustrated the principles of the invention in various preferred embodiments thereof, it should be apparent that the invention can be modified in arrangement and detail without departing from such principles. The following claims should therefore be interpreted to cover all such modifications and variations coming within the spirit and scope of the above-described invention.

What is claimed is:

1. A method of selecting a signal processor for processing a signal channel, said method comprising:
   selecting a signal processor that has sufficient bandwidth to open a new channel assuming that the new channel and any open but unestablished channels on the signal processor require more than a minimum amount of bandwidth per channel, wherein selecting a signal processor further comprises:
   determining whether an amount of available bandwidth in a first signal processor having a maximum amount of available bandwidth is sufficient to meet the bandwidth requirements of the new channel assuming that the new channel and any open but unestablished channels on the first signal processor will require a maximum amount of bandwidth per channel when established; and
   selecting the first signal processor if the amount of available bandwidth is sufficient.

2. A method according to claim 1, wherein selecting a signal processor further comprises:
   if the amount of available bandwidth of the first signal processor is not sufficient, then determining whether an amount of available bandwidth in a second signal processor is sufficient to meet the bandwidth requirements of the new channel assuming that the new channel and any open but unestablished channels on the second signal processor will require a maximum amount of bandwidth per channel when established; and
   selecting the second signal processor if the amount of available bandwidth in the second signal processor is sufficient.

3. A method according to claim 2, wherein selecting a signal processor further comprises:
   if the amount of available bandwidth in the second signal processor is not sufficient, then determining an amount of spare bandwidth in a plurality of processors; and
   selecting the processor with the greatest amount of spare bandwidth.

4. A method according to claim 3,
   wherein a minimum bandwidth amount is preallocated for open channels; and
   wherein the amount of spare bandwidth is equal to an amount of available bandwidth minus a maximum additional amount of bandwidth that would be required by any open but unestablished channels assuming that those channels will require the maximum amount of bandwidth per channel when established.

5. A method of selecting a signal processor for opening a signal channel, said method comprising:
   selecting a first signal processor from among a plurality of signal processors, wherein the first signal processor has a maximum amount of bandwidth available;
   opening the signal channel on the first signal processor if an available bandwidth on the first signal processor is greater than or equal to a maximum additional bandwidth that could possibly be required by that signal channel and opened but unestablished channels on the first signal processor; and
   attempting to locate a second signal processors having a maximum available bandwidth that is sufficient to support the maximum possible additional bandwidth required by the signal channel and the opened but unestablished channels, if the available bandwidth on the first signal processor is insufficient.

6. A method according to claim 5, further comprising locating a third signal processor having a maximum available spare bandwidth if the bandwidth on the second signal processor is insufficient, wherein the third signal processor can be the first signal processor, the second signal processor, or another signal processor.

7. A method of selecting a signal processor for opening a signal channel, said method comprising:
   selecting a first signal processor from among a plurality of signal processors, wherein the first signal processor has a maximum amount of bandwidth available; and
   opening the signal channel on the first signal processor if an available bandwidth on the first signal processor is greater than or equal to a maximum additional bandwidth that could possibly be required by that signal channel and opened but unestablished channels on the first signal processor, wherein an available bandwidth is greater than or equal to a maximum possible required bandwidth if it is greater than or equal to the number of opened but not established channels times the difference between maximum and minimum bandwidths per channel, plus the maximum bandwidth per channel.

8. A method of selecting a signal processor for opening a signal channel, said method comprising:
   selecting a first signal processor from among a plurality of signal processors, wherein the first signal processor has a maximum amount of bandwidth available; and
   opening the signal channel on the first signal processor if an available bandwidth on the first signal processor is greater than or equal to a maximum additional bandwidth that could possibly be required by that signal channel and opened but unestablished channels on the first signal processor, wherein selecting a first signal processor from among a plurality of signal processors further requires that the first signal processor have a minimum number of channels open compared to other signal processors.

9. A method of establishing a signal channel, said method comprising:
selecting a signal processor to hold a new channel;
opening the new channel in the selected signal processor;
preallocating a minimum amount of bandwidth to the new channel and other open but unestablished channels in the signal processor;
determining whether the selected signal processor can accommodate the new channel based on an actual bandwidth requirement of the new channel; and
immediately releasing the preallocated bandwidth for at least one of the channels if it is determined that the selected signal processor cannot accommodate the new channel.

10. A method according to claim 9, wherein selecting a signal processor comprises selecting a signal processor that has sufficient bandwidth to open the new channel assuming that the new channel and other open but unestablished channels on the signal processor will require a maximum amount of bandwidth per channel.

11. A method according to claim 9, wherein immediately releasing the preallocated bandwidth for at least one of the channels comprises releasing the preallocated bandwidth for one or more of the other open but unestablished channels.

12. A method according to claim 9, wherein immediately releasing the preallocated bandwidth for at least one of the channels comprises releasing the preallocated bandwidth for the new channel.

13. A method according to claim 9, further comprising using the released amount of preallocated bandwidth to satisfy the bandwidth requirements of another channel.

14. A method according to claim 9, wherein the signal processor is a digital signal processor and wherein the new channel is a voice-over-Internet Protocol channel.

15. A method of establishing a signal channel, said method comprising:
identifying a signal processor, the signal processor having a minimum amount of bandwidth preallocated for open but unestablished channels and a minimum amount of bandwidth available for a new channel;
determining whether the signal processor can accommodate the new channel assuming that all of the open but unestablished channels require more than a minimum amount of bandwidth;
selecting the signal processor to hold the new channel;
opening the new channel in the selected signal processor;
preallocating a minimum amount of bandwidth to the new channel;
determining whether the selected signal processor can accommodate the new channel based on an actual bandwidth requirement of the new channel; and
releasing the preallocated bandwidth for at least one of the open but unestablished channels if it is determined that the selected signal processor cannot accommodate the new channel.

16. The method of claim 15, wherein determining whether the signal processor can accommodate the new channel assuming that all open but unestablished channels require more than a minimum amount of bandwidth comprises determining whether the signal processor can accommodate the new channel assuming that all open but unestablished channels require a maximum amount of bandwidth.

17. The method of claim 15, wherein releasing the preallocated bandwidth for at least one of the channels comprises immediately releasing the preallocated bandwidth for one or more of the open but unestablished channels as soon as it is determined that the selected signal processor cannot accommodate the new channel.

18. The method of claim 17, further comprising using the released amount of preallocated bandwidth to satisfy the actual bandwidth requirements of the new channel.

19. The method of claim 17, wherein immediately releasing the preallocated bandwidth for at least one of the channels comprises releasing the preallocated bandwidth for the new channel and opening the new channel on another signal processor.

20. A method of selecting a signal processor for opening a signal channel, said method comprising:
identifying a first signal processor from among a plurality of signal processors, the first signal processor having a minimum amount of bandwidth preallocated for open but unestablished channels, wherein the first signal processor has a maximum amount of bandwidth available relative to the remaining signal processors;
determining whether the first signal processor has available bandwidth greater than or equal to a maximum additional bandwidth that could possibly be required by a new signal channel and the opened but unestablished channels on the first signal processor;
selecting the first signal processor when the available bandwidth of the first signal processor is greater than or equal to the maximum additional bandwidth; and
opening the new signal channel on the selected first signal processor.

21. The method of claim 20 further comprising:
identifying a second signal processor when the first signal processor does not have available bandwidth greater than or equal to the maximum additional bandwidth that could possibly be required by the new signal channel and the open but unestablished channels on the first signal processor; and
determining whether the second signal processor has available bandwidth greater than or equal to a maximum additional bandwidth that could possibly be required by the new signal channel and opened but unestablished channels on the second signal processor.

22. The method of claim 21 further comprising:
determining an amount of spare bandwidth in each of the plurality of signal processors and selecting the signal processor with the greatest amount of available bandwidth if the amount of available bandwidth in the second signal processor is less than the maximum additional bandwidth that could possibly be required by the new signal channel and opened but unestablished channels on the second signal processor.

* * * * *